(12) United States Patent
Lee

(10) Patent No.: US 11,368,636 B2
(45) Date of Patent: Jun. 21, 2022

(54) METHOD FOR ACQUIRING IMAGE CORRESPONDING TO INFRARED RAYS BY USING CAMERA MODULE COMPRISING LENS CAPABLE OF ABSORBING LIGHT IN VISIBLE LIGHT BAND AND ELECTRONIC DEVICE IMPLEMENTING SAME

(71) Applicant: SAMSUNG ELECTRONICS CO., LTD., Suwon-si (KR)

(72) Inventor: Jeongyeol Lee, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 16/970,813

(22) PCT Filed: Feb. 25, 2019

(86) PCT No.: PCT/KR2019/002269
§ 371 (c)(1),
(2) Date: Aug. 18, 2020

(87) PCT Pub. No.: WO2019/164359
PCT Pub. Date: Aug. 29, 2019

(65) Prior Publication Data
US 2021/0006733 A1    Jan. 7, 2021

(30) Foreign Application Priority Data
Feb. 23, 2018    (KR) .......................... 10-2018-0021873

(51) Int. Cl.
*H04N 7/18* (2006.01)
*H04N 5/33* (2006.01)
(Continued)

(52) U.S. Cl.
CPC ................. *H04N 5/33* (2013.01); *G02B 1/11* (2013.01); *H04N 5/2254* (2013.01); *H04N 5/2257* (2013.01)

(58) Field of Classification Search
CPC ...... H04N 5/33; H04N 5/2254; H04N 5/2257; H04N 5/2256; G02B 1/11; G02B 5/281; G02B 13/008; G02B 7/02
(Continued)

(56) References Cited

U.S. PATENT DOCUMENTS 10,051,159 B2    8/2018 Matsuzaki et al.
10,527,764 B2    1/2020 Kim et al.
(Continued)

FOREIGN PATENT DOCUMENTS

JP    2561800    2/1998
JP    2007-264116    10/2007
(Continued)

OTHER PUBLICATIONS

International Search Report for PCT/KR2019/002269 dated Jun. 24, 2019, 5 pages.
(Continued)

*Primary Examiner* — Shan E Elahi
(74) *Attorney, Agent, or Firm* — Nixon & Vanderhye, P.C.

(57) ABSTRACT

According to an embodiment of the disclosure, an electronic device includes a light source unit to emit infrared light having a specified wavelength band, a camera module, a memory, and a processor, the camera module includes a lens assembly including a first lens having a property to at least partially absorb visible light and one or more second lenses to refract light, which is output through the first lens, at a specified angle, a filter to pass through light, which has the specified wavelength band, of the light output through the
(Continued)

lens assembly, and an image sensor to sense light, which is output through the lens assembly and the filter, to obtain an image, and the processor is configured to receive an input of a user to photograph an external object, emit the infrared light using the light source unit based on the input of the user, and obtain, using the camera module, an image corresponding to light, which is reflected from the external object, of the emitted infrared light.

15 Claims, 11 Drawing Sheets

(51) Int. Cl.
    *G02B 1/11*     (2015.01)
    *H04N 5/225*    (2006.01)

(58) Field of Classification Search
    USPC .......................................................... 348/164
    See application file for complete search history.

(56) References Cited

U.S. PATENT DOCUMENTS

| | | | | |
|---|---|---|---|---|
| 2014/0106264 | A1* | 4/2014 | Campidell | G03F 1/50 |
| | | | | 430/5 |
| 2015/0116576 | A1* | 4/2015 | Grandin | H04N 5/232935 |
| | | | | 348/342 |
| 2016/0165214 | A1* | 6/2016 | Kim | H04N 13/254 |
| | | | | 348/49 |
| 2018/0096204 | A1* | 4/2018 | Hyun | G06K 9/22 |
| 2019/0082519 | A1* | 3/2019 | Gagne-Keats | G01J 3/0235 |
| 2019/0125249 | A1* | 5/2019 | Rattner | A61B 5/445 |
| 2019/0353909 | A1* | 11/2019 | Yin | G02B 27/0172 |
| 2020/0073028 | A1* | 3/2020 | Shigemitsu | B29D 11/00 |
| 2020/0183128 | A1* | 6/2020 | Lee | G02B 9/34 |
| 2020/0241250 | A1* | 7/2020 | Kim | G02B 9/60 |

FOREIGN PATENT DOCUMENTS

| | | |
|---|---|---|
| JP | 2016-36127 | 3/2016 |
| KR | 10-1580463 | 12/2015 |
| KR | 10-2016-0069219 | 6/2016 |
| KR | 20-0482563 | 2/2017 |
| KR | 10-2018-0013415 | 2/2018 |

OTHER PUBLICATIONS

Written Opinion of the ISA for PCT/KR2019/002269 dated Jun. 24, 2019, 5 pages.

* cited by examiner

METHOD FOR ACQUIRING IMAGE CORRESPONDING TO INFRARED RAYS BY USING CAMERA MODULE COMPRISING LENS CAPABLE OF ABSORBING LIGHT IN VISIBLE LIGHT BAND AND ELECTRONIC DEVICE IMPLEMENTING SAME

This application is the U.S. national phase of International Application No. PCT/KR2019/002269 filed Feb. 25, 2019 which designated the U.S. and claims priority to KR Patent Application No. 10-2018-0021873 filed Feb. 23, 2018, the entire contents of each of which are hereby incorporated by reference.

Technical Field

Embodiments disclosed in the disclosure relate to a camera module using infrared light and an electronic device including the same.

Description of Related Art

Various types of electronic devices, such as a smartphone, and a tablet personal computer (PC), have been widely spread with the development of an information technology (IT).

Electronic devices may perform various functions using camera modules. For example, the electronic device may obtain an image of an arbitrary object using a camera module. For another example, the electronic device may perform an iris recognition function or a depth sensing function through a camera module using infrared light.

An image obtained through the camera module using infrared light may be used for security. For example, the electronic device may determine and authenticate whether the user is a legitimate user through iris recognition or face depth measurement of the user.

The camera module using infrared light requires a separate light source unit to emit light in a specified wavelength band. The infrared light emitted from the light source unit may be reflected to correspond to an external object. The camera module may obtain the reflected infrared light, thereby obtaining an image of the external object.

Summary

To use an image obtained through a camera module using the infrared light for security purposes, the camera module should obtain an accurate and clear image of an object. To this end, light in a specified wavelength band needs to be incident onto the camera module.

However, the light incident onto the camera module may include light, such as visible light, in a different wavelength band present around the camera module, as well as the infrared light. When the light in the different wavelength band reaches the image sensor inside the camera module, it may be difficult for the camera module to obtain the clear image of the external object.

To solve the above problem, a method of blocking light in a different wavelength band through a filter based on reflective coating may be considered. However, in this case, a problem may arise in that the wavelength band of the reflected light or the wavelength band of the light passing through the reflective coating varies depending on the angle of light incident from the outside. For example, light having a shorter wavelength may pass through the reflective coating when light is incident at an angle, as compared to when light is incident vertically.

The wavelength band of the light passing through the reflective coating depends on an incident angle, so the bandwidth of the filter needs to be set to be wider. When the bandwidth of the filter is set to be wider, the blocking rate for light in a wavelength band other than a desired wavelength band may be lowered, and the camera module may still be difficult to obtain a clearer image.

In addition, when the camera module using the reflective coating is mounted on the electronic device, a problem may occur in which the reflected light of the camera module is recognized by the user from the outside. The reflected light may degrade the aesthetics of the electronic device and may affect the usability of the user.

Embodiments disclosed in the disclosure are to provide an electronic device to solve the above problems and to resolve the issues raised herein.

According to an embodiment disclosed herein, an electronic device may include a light source unit to emit infrared light having a specified wavelength band, a camera module, a memory, and a processor, the camera module may include a lens assembly including a first lens having a property to at least partially absorb visible light and one or more second lenses to refract light output through the first lens at a specified angle, a filter to pass through light, which has the specified wavelength band, of the light output through the lens assembly, and an image sensor to sense light, which is output through the lens assembly and the filter, to obtain an image, and the processor may be configured to receive an input of a user to photograph an external object, emit the infrared light using the light source unit based on the input of the user, and obtain, using the camera module, an image corresponding to light, which is reflected from the external object, of the emitted infrared light.

In addition, according to an embodiment disclosed herein, a camera module may include a lens assembly, a filter to pass through light, which has a specified wavelength band, of light output through the lens assembly, and an image sensor to obtain an IR image in response to light output through the lens assembly and the filter. The lens assembly may include a first lens having a property to at least partially absorb visible light of light incident from an outside, and at least one lens to pass through light output through the first lens.

In addition, according to another embodiment disclosed herein, an electronic device may include a housing including a cover glass including a first area and a second area to pass light, a back cover opposite to the cover glass, and a side member surrounding the space between the cover glass and the back cover, the light source unit to emit infrared light having a specified wavelength band toward the outside through the first area, a camera module, a memory, and a processor. The camera module may include a lens assembly including a first lens having a property to at least partially absorb visible light band of light incident from the outside through the second area, and a second lens through which the light output from the first lens passes, a filter to pass through light, which includes the specified wavelength band, of the light output through the lens assembly, and an image sensor to obtain an image in response to the light output through the lens assembly and the filter.

According to the embodiments disclosed herein, the camera module may effectively pass light in a specified wavelength band. Accordingly, the camera module may obtain a clearer image regardless of the incident angle of light. In addition, the electronic device including the camera module may increase aesthetics and provide excellent usability to the user. Besides, a variety of effects directly or indirectly understood through the disclosure may be provided.

BRIEF DESCRIPTION OF THE DRAWINGS

In the following description made with respect to the accompanying drawings, similar components will be assigned with similar reference numerals.

DETAILED DESCRIPTION OF EXAMPLE EMBODIMENTS

Figure 1:
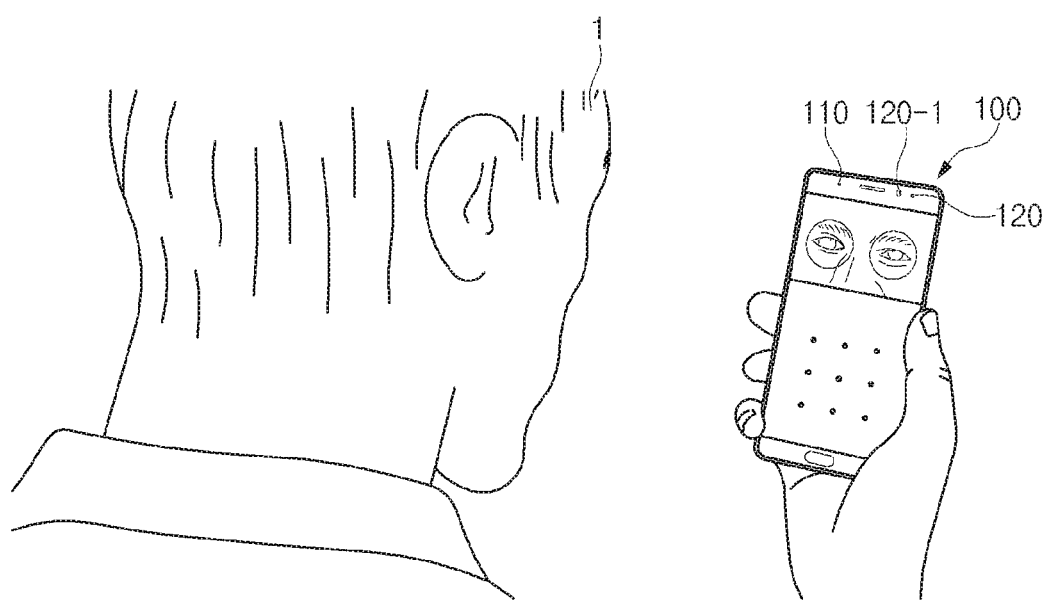
FIG. 1 illustrates an electronic device including a camera module, according to an embodiment.

FIG. 1 illustrates an electronic device including a camera module, according to an embodiment.

Referring to FIG. 1, an electronic device 100 may obtain an image of an external object, for example, a body part of a user 1 using a first camera module 120 or a second camera module 120-1. In an embodiment, the first camera module 120 may obtain an image by using infrared light. For example, when infrared light emitted from a light source unit 110 is reflected from an external object to reach the first camera module 120, the first camera module 120 may obtain an infra-red image (IR) correspond to the external object from the reflected infrared light. In an embodiment, unlike the first camera module 120, the second camera module 120-1 may obtain an image by using light including visible light. In the disclosure, the first camera module 120 may be referred to as an infrared camera module 120, a security camera module 120, or a camera module 120.

According to an embodiment, the electronic device 100 may obtain an image of the iris of the user 1 using the first camera module 120. In one embodiment, the image of the photographed iris may be used for security. For example, the electronic device 100 may determine whether the photographed image of the iris is the same as the image of the iris previously stored in a memory, and authenticate whether the user 1 is a legitimate user. The electronic device 100 may unlock a screen, for example, when the user 1 is authenticated as the legitimate user.

According to another embodiment, the electronic device 100 may obtain an image of the face of the user 1, for example, an image including depth information of the face using the camera module. In one embodiment, the image including depth information of the face may be used for security together with the image for the iris. For example, the electronic device 100 may perform user authentication by determining whether a portion of the iris and the depth information of the face in the image are the same as data previously stored in the memory. When the user 1 is authenticated as the legitimate user, the electronic device 100 may, for example, log in a specified application.

According to an embodiment, the electronic device 100 may include a housing. The housing may include a cover glass, a back cover opposite the cover glass, and a side member surrounding the space between the cover glass and the back cover. The housing may protect internal components of the electronic device 100 from the outside.

According to an embodiment, various modules to obtain an image may be disposed in the direction of the cover glass on a front surface portion of the electronic device 100. For example, the light source unit 110, the first camera module 120, and the second camera module 120-1 may be disposed on the front surface portion of the electronic device 100.

According to an embodiment, the various modules 110, 120, and 120-1 may receive light from the outside or emit light toward the outside, through at least a portion of the cover glass. In other words, the cover glass may include at least some areas through which light may pass. For example, the cover glass may include a first area through which infrared light emitted from the light source unit 110 may pass. For another example, the cover glass may include a second area through which the infrared light passes, such that the infrared light reflected from the external object reaches the first camera module 120.

In the disclosure, the component having the same reference numeral as that of the electronic device 100 illustrated in FIG. 1 may have the same description made with reference to FIG. 1. Hereinafter, the camera module 120 and the electronic device 100 including the camera module 120 will be described with reference to FIGS. 2 to 11.

Figure 2:
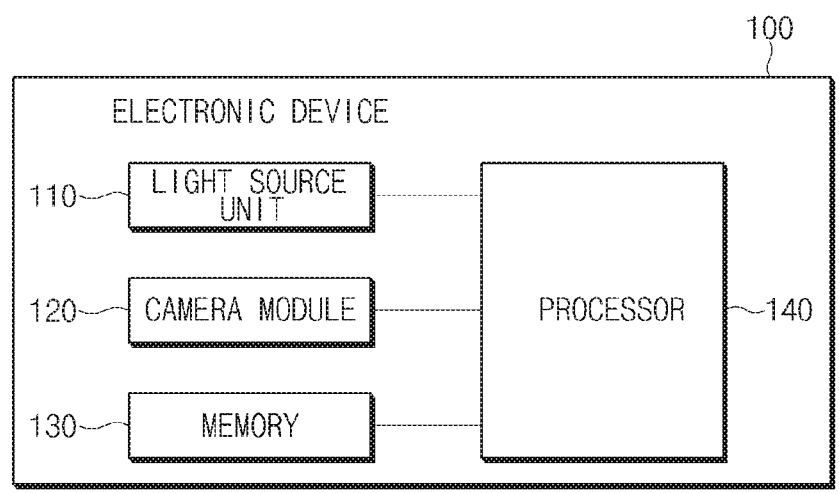
FIG. 2 illustrates block diagram of an electronic device, according to an embodiment of the disclosure.

FIG. 2 illustrates block diagram of an electronic device, according to an embodiment of the disclosure.

Referring to FIG. 2, the electronic device 100 may include the light source unit 110, the camera module 120, a memory 130, and a processor 140. According to various embodiments, the electronic device 100 may not include some of components illustrated in FIG. 2, or may further include a component not illustrated in FIG. 2. For example, the electronic device 100 may further include a second camera module (e.g., the second camera module 120-1 of FIG. 1) distinguished from the camera module 120.

The light source unit 110 may emit infrared light having a specified wavelength band. According to an embodiment, the light source unit 110 may emit infrared light having the wavelength of 800 nm to 950 nm, for example, the wavelength of 810 nm.

According to an embodiment, the light source unit 110 may include a light emitting device, for example, a light emitting diode (LED) to emit infrared light. The light emitting device may emit infrared light having a specified wavelength under control of the processor 140. The infrared light having the specified wavelength may be emitted to the outside of the electronic device 100 through a specified area of the cover glass.

The camera module 120 may receive light having a specified wavelength band from the outside and may generate an image corresponding to the received light. According to an embodiment, the camera module 120 may receive infrared light, which is emitted from the light source unit 110 and reflected from an external object, having a specified wavelength band. The camera module 120 may generate an image of the external object by using an electrical signal corresponding to the received infrared light.

According to an embodiment, the camera module 120 may transmit the generated image to the processor 140. For example, the camera module 120 may compress or encode the generated image and transmit the compressed or encoded image to the processor 140 through a specified interface.

According to an embodiment, the camera module 120 may receive infrared light having a wavelength in the same band as that of the infrared light emitted from the light source unit 110. According to an embodiment, the camera module 120 may receive infrared light having the wavelength of 800 nm to 950 nm, for example, the wavelength of 810 nm.

According to an embodiment, light incident onto the camera module 120 may have various wavelength bands. For example, the light incident onto the camera module 120 may include visible light or infrared light. According to an embodiment, the camera module 120 may block at least a portion of light of another band except the infrared light having the specified wavelength band, in the incident light. For example, the camera module 120 may block at least a portion of visible light. For another example, the camera module 120 may block at least partially infrared light in a remaining wavelength band, for example, longer than 950 nm except for a specified wavelength band.

The memory 130 may store a specified file or specified instructions associated with an operation performed in the processor 140. For example, the memory 130 may store an image of the iris of the legitimate user. For another example, the memory 130 may store the instructions associated with the operation causing the processor 140 to control the light source unit 110 and the camera module 120 to generate an image of an external object. According to an embodiment, the memory 130 may transmit the stored file or instructions to the processor 140 through a specified interface.

The processor 140 may be electrically connected to components included in the electronic device 100 to execute operations or data processing associated with control and/or communication of the components included in the electronic device 100. For example, the processor 140 may process the image obtained by the camera module 120 by executing instructions stored in the memory 130. For example, the processor 140 may perform the authentication of the legitimate user using the obtained image.

According to an embodiment, the processor 140 may receive a user input for photographing an external object. For example, the electronic device 100 may receive a user input for executing an application requiring security, for example, a payment application. For another example, the electronic device 100 may receive a user input for a function requiring the authentication of the legitimate user, for example, a function of unlocking a screen. According to various embodiments, the user input may be received through various input devices, such as a touch panel or a microphone, included in the electronic device 100.

According to an embodiment, the processor 140 may control the light source unit 110 to emit infrared light having a specified wavelength band toward the outside based on the user input. The emitted infrared light may be reflected from an external object, for example, an iris of a user. The processor 140 may control the camera module 120 to obtain an image of the external object through the reflected infrared light.

In the disclosure, the component having the same reference numeral as that of the electronic device 100 illustrated in FIG. 2 may have the same description made with reference to FIG. 2.

Figure 3:
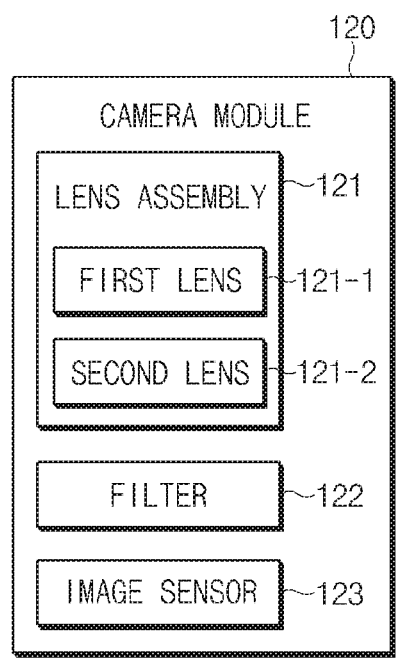
FIG. 3 is a block diagram of a camera module, according to an embodiment.

FIG. 3 is a block diagram of a camera module, according to an embodiment.

Referring to FIG. 3, the camera module 120 may include a lens assembly 121, a filter 122, and an image sensor 123. According to an embodiment, the components of the camera module 120 may be arranged in order of the lens assembly 121, the filter 122, and the image sensor 123 from the outside along a path of light incident from the outside. According to various embodiments, the camera module 120 may not include some of components illustrated in FIG. 3, or may further include a component not illustrated in FIG. 3. For example, the camera module 120 may further include an image signal processor (ISP) to process an image obtained by the image sensor 123, and an interface for transmitting data to the processor 140

The lens assembly 121 may include a plurality of lenses. According to an embodiment, the lens assembly 121 may include a first lens 121-1 having a property to at least partially absorb visible light in the light incident from the outside, and a second lens 121-2 to pass through light output through the first lens 121-1. In an embodiment, each of the first lens 121-1 or the second lens 121-2 may include at least one lens. According to an embodiment, the components of the lens assembly 121 may be arranged in the order of the first lens 121-1 and the second lens 121-2 from the outside along a path of light incident from the outside.

According to an embodiment, the lens assembly 121 may collect light incident from the outside using the first lens 121-1 and the second lens 121-2. For example, the first lens 121-1 and the second lens 121-2 may refract light incident from the outside at a specified angle. The refracted light may be collected at a specified position of the image sensor 123 through the filter 122.

According to an embodiment, an anti-reflective coating may be formed on an outer portion of the surface of the first lens 121-1. The anti-reflective coating may reflect light, which is incident thereto from the outside, to be at a specified level or less. For example, the anti-reflective coating may cause destructive interference between lights reflected from different positions. When the destructive interference occurs, the externally recognized reflected light may be at the specified level or less.

According to an embodiment, the first lens 121-1 may at least partially absorb visible light of light incident from the outside. In other words, at least a portion of the visible light may be blocked by the first lens 121-1. According to an embodiment, the first lens 121-1 may be injection-molded using a material that absorbs at least a portion of the visible light. For example, the first lens 121-1 may be injection-molded using a material of a cyclo-olefin polymer (COP) or a polycarbonate (PC). When the first lens 121-1 absorbs at least a portion of the visible light, light output through the first lens 121-1 may include visible light which is at the specified level or less.

The filter 122 may be a band pass filter (BPF) to pass through light, which has a specified wavelength band, of light output through the lens assembly 121. In other words, the filter 122 may at least partially block the light output through the lens assembly 121. According to an embodiment, the filter 122 may be implemented through a reflective coating or a reflective coating film. The reflective coating or the reflective coating film may pass only light having a specified wavelength band, and may reflect light having a wavelength in the remaining band.

According to an embodiment, the bandwidth of the filter 122 may include a wavelength band, such as the band of 800 nm to 950 nm, of infrared light emitted from the light source unit 110. For example, the bandwidth of the filter 122 may be in the band of 650 mm to 1000 mm.

According to one embodiment, most of the light output through the lens assembly 121 and the filter 122 may be light having a specified wavelength band. For example, most of the light may be infrared light having a wavelength in the band of 800 nm to 950 nm. In other words, light, which has a wavelength in the band of 800 nm to 950 nm, of the light incident from the outside may have a higher transmittance, and light having a wavelength shorter than 800 nm or longer than 950 nm may have a transmittance lower than a specified level.

According to an embodiment, the light output through the filter 122 may have a shorter wavelength based on the incident angle. However, the visible light has been already blocked to be at the specified level or less through the first lens 121-1. Accordingly, the light output through the filter 122 may not include surrounding light, for example, visible light at the specified level or more, except for infrared light having the specified wavelength band. Accordingly, the lens assembly 121 and the filter 122 may effectively block light having a wavelength in a remaining band except for light having the specified wavelength band.

The image sensor 123 may generate an image (or image data) corresponding to the light output through the filter 122. According to an embodiment, the image sensor 123 may be implemented using a charge-coupled device (CCD) or a complementary metal-oxide-semiconductor (CMOS).

According to an embodiment, the image sensor 123 may include a plurality of pixels. The plurality of pixels may generate an electrical signal (e.g., current) that is the basis of the image in response to the received light. The image generated using the electrical signal may be transmitted to the processor 140 through a specified interface.

In the disclosure, the component having the same reference numeral as that of the camera module 120 illustrated in FIG. 3 may have the same description made with reference to FIG. 3.

Figure 4:
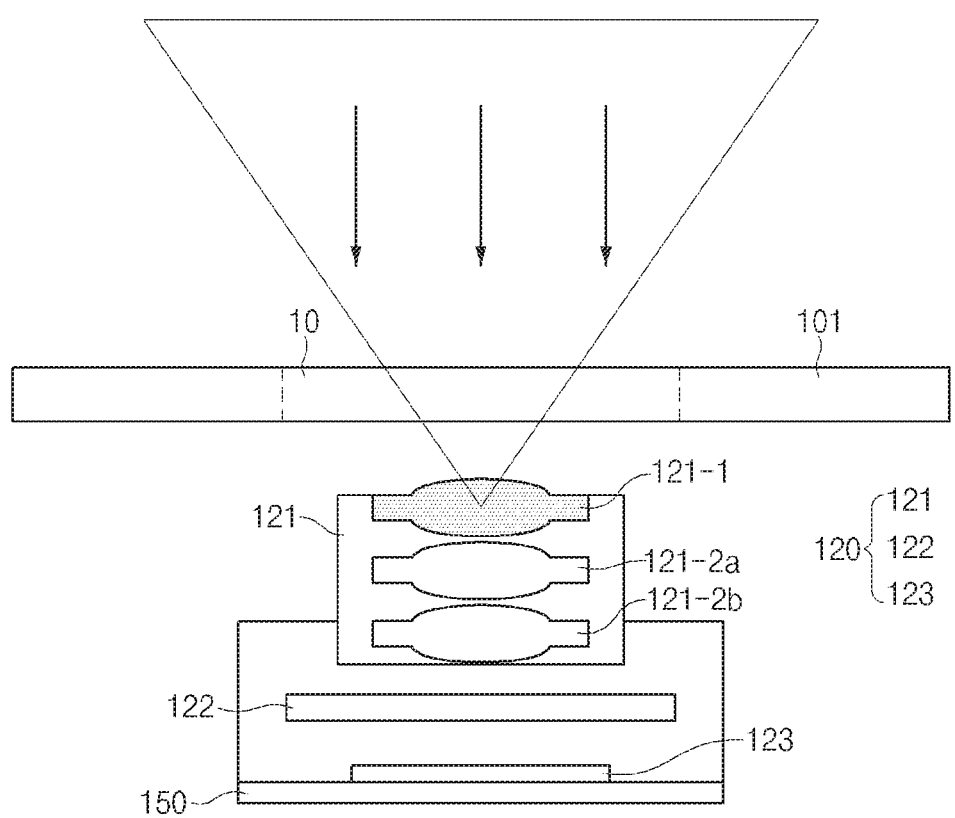
FIG. 4 is a view illustrating the structure of a camera module, according to an embodiment.

FIG. 4 is a view illustrating the structure of a camera module, according to an embodiment. However, according to the disclosure, the structural diagram of the camera module 120 is not limited to that illustrated in FIG. 4. In the following description made with reference to FIG. 4, the same as or similar to those of the description made with reference to FIG. 3 will be omitted to avoid redundancy.

Referring to FIG. 4, the camera module 120 may be disposed inside a cover glass 101 and may receive light incident from the outside through a second area 10 of the cover glass 101. According to one embodiment, the width of the second area 10 may be equal to or larger than that of the angle of view area of the camera module 120.

According to an embodiment, the camera module 120 may include the lens assembly 121, the filter 122, and the image sensor 123. According to one embodiment, light incident from the outside and output through the second area 10 of the cover glass 101 sequentially passes through the lens assembly 121 and the filter 122 and reaches the image sensor 123. When the light reaches the image sensor 123, the image sensor 123 may obtain an image from the light.

In one embodiment, the image sensor 123 may be attached to a printed circuit board (PCB) 150. The image sensor 123 may be electrically connected to the processor 140 through the PCB 150, and may transmit the obtained image to the processor 140.

The lens assembly 121 may include the first lens 121-1 and second lenses 121-2a and 121-2b. In another embodiment, each of the first lens 121-1 or the second lenses 121-2a and 121-2b may include at least one lens. For example, as illustrated in FIG. 4, the first lens 121-1 may include one lens, and the second lenses 121-2a and 121-2b may include two lenses. For another example, unlike the configuration illustrated in FIG. 4, the first lens 121-1 may include two lenses, and the second lenses 121-2a and 121-2b may include one lens.

According to an embodiment, the first lens 121-1 may include a material that absorbs at least a portion of visible light. According to an embodiment, the thickness of the first lens 121-1 may be at least 0.15 mm or more. According to various embodiments, as the thickness of the first lens 121-1 is increased, the degree of absorbing visible light may be increased. The thickness or number of the first lenses 121-1 may be determined depending on the degree of absorbing the visible light, costs, or the size of the lens assembly 121.

According to an embodiment, unlike the first lens 121-1, the second lenses 121-2a and 121-2b may not absorb light in some bands. The second lenses 121-2a and 121-2b may refract light output through the first lens 121-1 at a specified angle.

The light output through the lens assembly 121 may pass through the filter 122 to reach the image sensor 123. The image sensor 123 may generate an image corresponding to the light output through the filter 122 and transmit the image to the processor 140.

Figure 5:
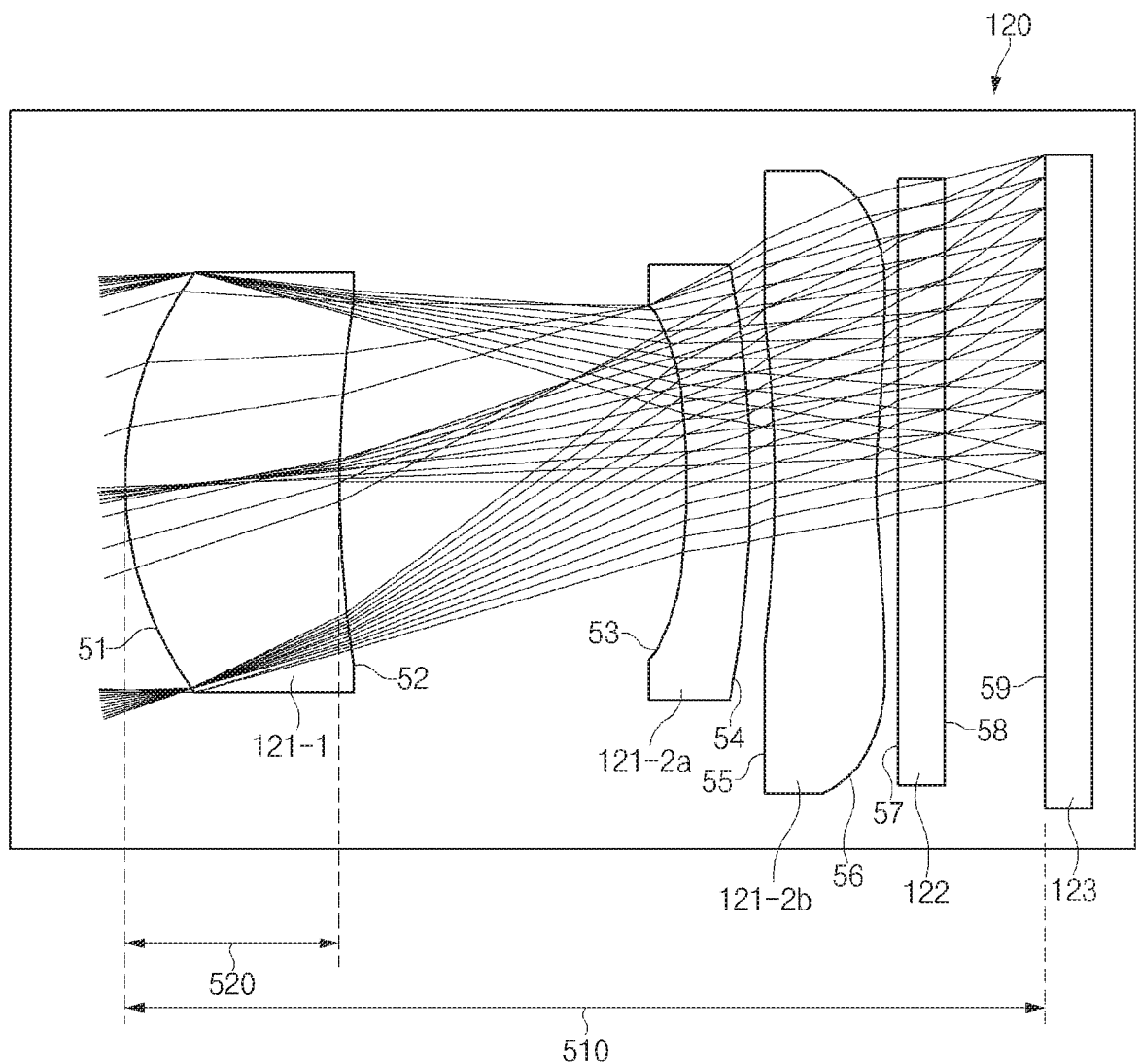
FIG. 5 is a view illustrating a path of light incident onto a camera module, according to an embodiment.

FIG. 5 is a view illustrating a path of light incident onto a camera module, according to an embodiment.

Referring to FIG. 5, the path of light incident onto the camera module 120 may sequentially include the first lens 121-1, the second lens 121-2a, the second lens 121-2b, and the filter 122, and the image sensor 123. According to various embodiments, the number of the first lenses 121-1 or the number of the second lenses 121-2a and 121-2b is not limited to that illustrated in FIG. 5. For example, the camera module 120 may include two first lenses 121-1 separated from each other.

According to one embodiment, the light may be refracted at boundary planes of the components included in the camera module 120. In one embodiment, the light may reach a ninth plane 59 of the image sensor 123 through a plurality of boundary planes, for example, eight boundary planes. The boundary plane may be, for example, a first plane 51 and a second plane 52 of the first lens 121-1, a third plane 53 and a fourth plane 54 of the second lens 121-2a, a fifth plane 55 and the sixth plane 56 of the second lens 121-2b, and a seventh plane 57 and an eighth plane 58 of the filter 122.

According to one embodiment, the first plane 51 to the ninth plane 59 may be any one of a flat surface, a spherical surface, or an aspherical surface. For example, the seventh plane 57 to the ninth plane 59 included in the filter 122 or the image sensor 123 may be a flat surface. For another example, the first plane 51 to the sixth plane 56 included in the first lens 121-1, the second lens 121-2a, or the second lens 121-2b may be spherical surfaces or aspherical surfaces. In an embodiment, at least one of the first plane 51 and the second plane 52 of the first lens 121-1 may be an aspherical surface. According to various embodiments, the characteristics of the boundary planes may be variously designed depending on the characteristics of the camera module 120.

According to an embodiment, the first lens 121-1 may be designed such that a radius of curvature of the first plane 51 satisfies a specified equation together with a total focal length. For example, when the total focal length of the lens assembly 121 is 'f' and the radius of curvature of the first plane 51 is 'R', the first lens 121-1 may be designed to have a value of f/R1 of 0.3 or more and 6.0 or less.

According to one embodiment, an anti-reflective coating may be formed on the first plane 51. The anti-reflective coating may improve the outer appearance of the camera module 120 by preventing the light incident onto the first plane 51 from being reflected to the outside. In one embodiment, the anti-reflective coating may cause destructive interference between different reflected lights. As a result, the externally recognized reflected light may be at a specified level or less.

According to an embodiment, the size of the camera module 120 may be limited such that the camera module 120 may be mounted in the electronic device 100, for example, a smart phone or a tablet PC. For example, a total length 510 of the camera module 120 may be 6.5 mm or less. The total length 510 of the camera module 120 may indicate a length from the center of the first plane 51 to the center of the ninth plane 59.

According to an embodiment, a thickness 520 of the first lens 121-1 may be limited based on the total length 510 of the camera module 120. For example, the thickness 520 of the first lens 121-1 may be 0.15 mm or more and 5 mm or less. The thickness 520 of the first lens 121-1 may indicate a length from the center of the first plane 51 to the center of the second plane 52. In various embodiments, when the number of the first lenses 121-1 is two or more, the sum of the thicknesses 520 of the first lenses 121-1 may be 0.15 mm or more and 5 mm or less. According to another embodiment, the thickness 520 of the first lens 121-1 may be designed to be smaller based on the size of the electronic device 100. For example, the thickness 520 of the center of the first lens 121-1 may be 0.15 mm or more and 4 mm or less. For example, the thickness 520 of the center of the first lens 121-1 may be 0.15 mm or more and 3 mm or less. For example, the thickness 520 of the center of the first lens 121-1 may be 0.15 mm or more and 2.5 mm or less.

Figure 6:
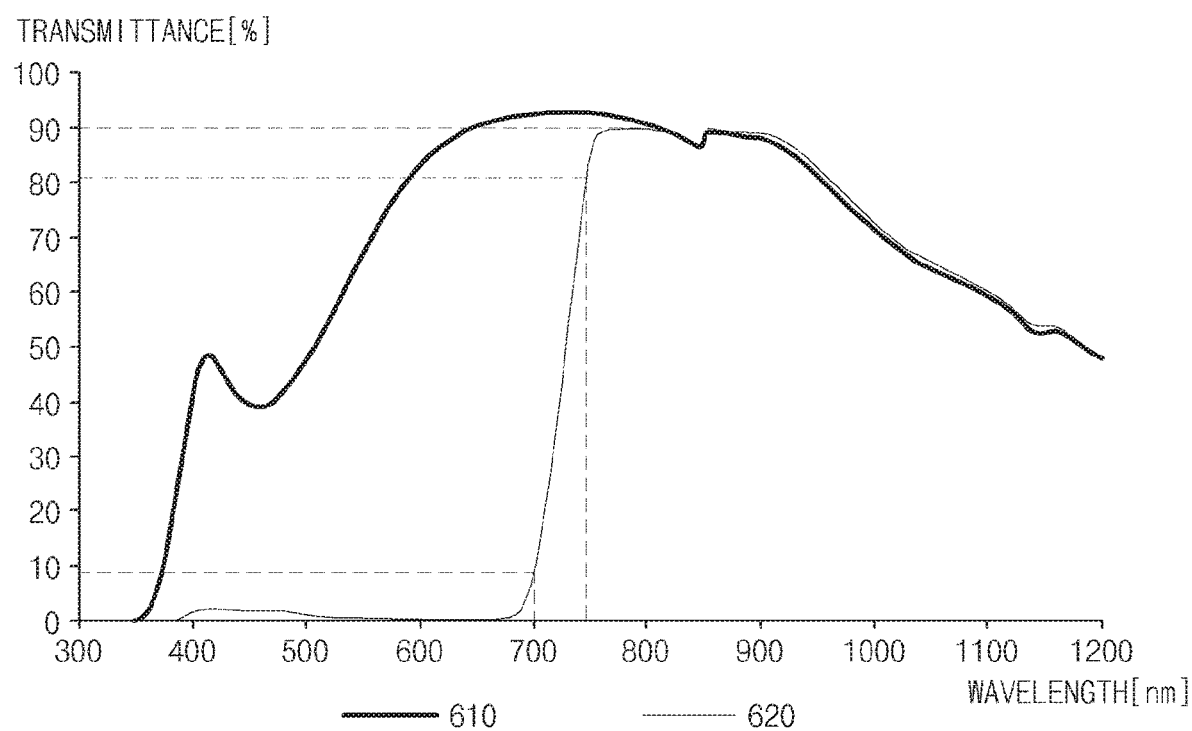
FIG. 6 illustrates transmittance of light for a wavelength of the light in a lens assembly, according to various embodiments.

FIG. 6 illustrates transmittance of light for a wavelength of the light in a lens assembly, according to various embodiments of the disclosure.

Referring to FIG. 6, a first graph 610 and a second graph 620 are illustrated to indicate the transmittance of light depending on the wavelength of the light in the lens assembly 121. The first graph 610 may represent the transmittance of light in a conventional lens assembly 121 that blocks visible light in a lens using a reflective coating. According to one embodiment, the second graph 620 may indicate the transmittance of light in the lens assembly 121 according to the disclosure.

Referring to the first graph 610, it may be understood that the transmittance of light having a wavelength of 400 nm or more and 700 nm or less in the first graph 610 is at a specified level, for example, is about 30% or more in the first graph 610. In this case, the visible light included in the light incident onto the filter 122 may be at the specified level or more.

Referring to the second graph 620, it may be recognized that the transmittance of light having a wavelength of 400 nm or more and 700 nm or less is at the specified level, for example, is approximately 20% or less in the second graph 620. In this case, the visible light included in the light incident on the filter 122 may be at a specified level or less.

According to an embodiment, the gradient at a point at which light starts to be transmitted to be at a specified level or more in the second graph 620 may be at a specified level or more. The gradient may be defined, for example, as the interval between the wavelength at the point having a transmittance of 90% relative to the maximum transmittance and the wavelength at the point having a transmittance of 10% relative to the maximum transmittance. It may be understood that the gradient becomes more steeper as the interval between the wavelengths is reduced, and the gradient is gentler as the interval between the wavelengths is increased.

According to an embodiment, it may be recognized that the gradient at the specified level or more is 100 nm or less. Referring to the second graph 620, according to an embodiment, the maximum transmittance may be about 90%. In the second graph 620, the wavelength at the point having a transmittance of about 90% (about 81%) relative to the maximum transmittance may be approximately 730 nm, and the wavelength at a point having a transmittance of about 10% (about 9% transmittance) relative to the maximum transmittance may be about 680 nm. The gradient of the second graph 620 is 50 nm, so it may be understood that the lens assembly 121 based on the second graph 620 has a gradient at the specified level or more.

Referring to the first graph 610 and the second graph 620, it may be recognized that the lens assembly 121 according to the disclosure effectively blocks visible light as compared to the lens assembly 121 using the reflective coating.

Figure 7:
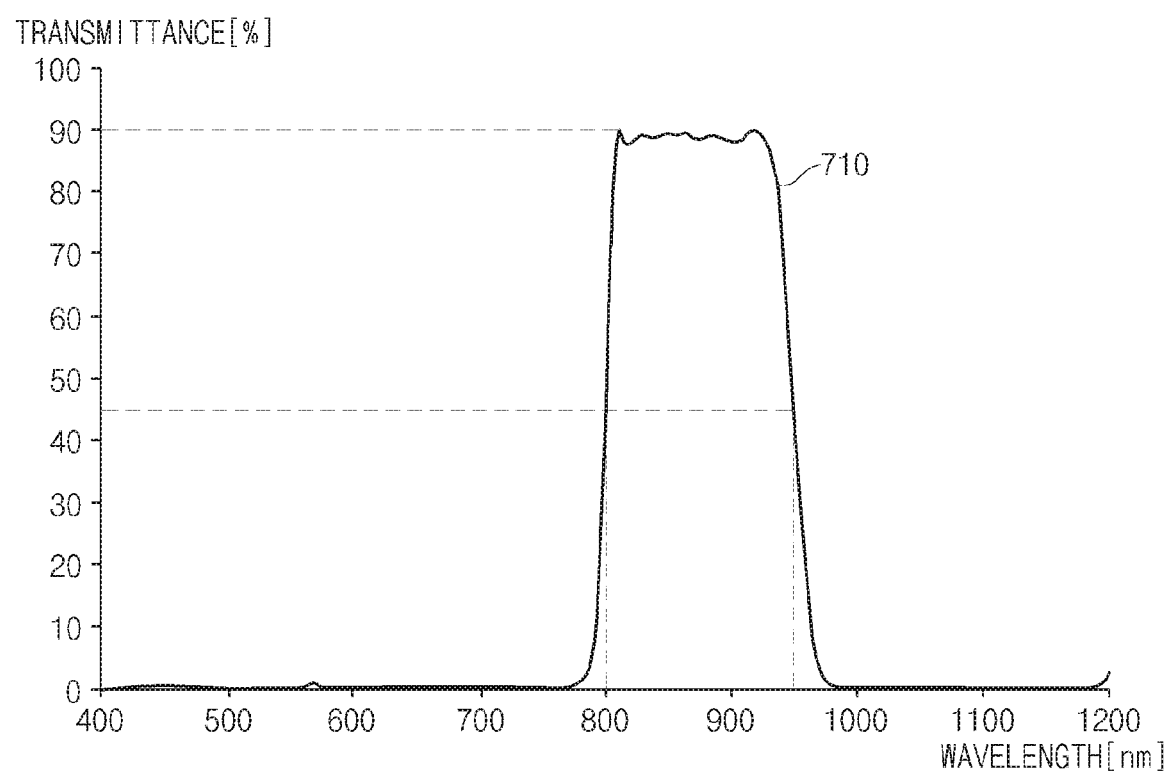
FIG. 7 illustrates transmittance of light for a wavelength of the light in a camera module, according to an embodiment.

FIG. 7 illustrates transmittance of light for a wavelength of the light in a camera module, according to an embodiment.

Referring to FIG. 7, according to the disclosure, the transmittance of light with respect to the wavelength of the light in the camera module 120 may be the same as or similar to that of the first graph 710. In other words, when light having a spectrum characteristic the same as or similar to that of the second graph 620 of FIG. 6 passes through the filter 122, the transmittance of the light in the whole camera module 120 may be the same or similar to that of the first graph 710.

Referring to the first graph 710, it may be understood that only light having a specified wavelength band is transmitted to reach the image sensor 123. According to an embodiment, the specified band may be a wavelength band of approximately 780 nm to 980 nm.

According to an embodiment, the pass band of light in the first graph 710 may be 800 nm or more and 950 nm or less. The pass band may be defined as, for example, a band having a transmittance of 50% or more relative to the maximum transmittance. Referring to the first graph 710, according to an embodiment, the maximum transmittance may be about 90%. In the first graph 710, a band having a transmittance of about 50% (about 45%) relative to the maximum transmittance may be about 800 nm or more and 950 nm.

According to various embodiments, the pass band may be set differently from that illustrated in FIG. 7. For example, the pass band may be designed to be 800 nm or more and 820 nm. In various embodiments, the pass band may be designed to include a wavelength of 810 nm.

Figure 8:
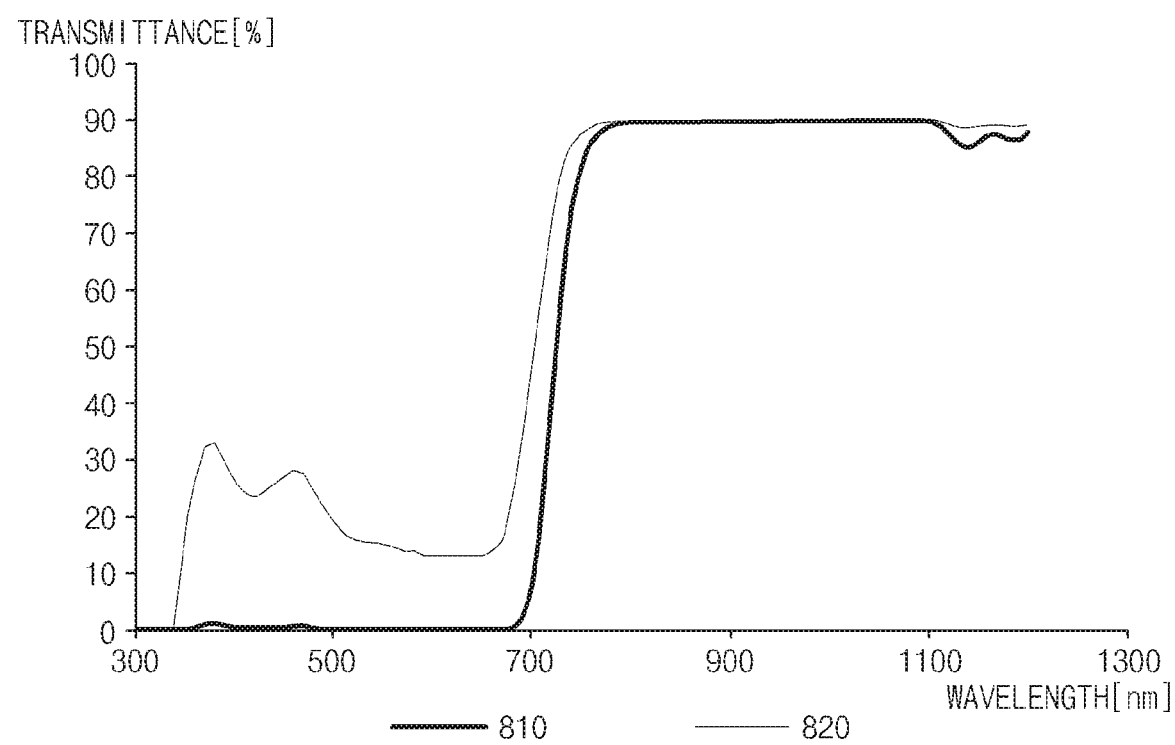
FIG. 8 illustrates transmittance of light for a wavelength of the light in a material to absorb visible light, according to various embodiments.

FIG. 8 illustrates transmittance of light for a wavelength of the light in a material to absorb visible light, according to various embodiments.

Referring to FIG. 8, a first graph 810 and a second graph 820 are illustrated to represent the transmittance of light for the wavelength of light in the material to absorb the visible light. It may be recognized that the first graph 810 and the second graph 820 represent transmittances of the material rather than the lens. The first graph 810 may indicate the case that the thickness of the material to absorb the visible light is 1 mm, and the second graph 820 may indicate the case that the thickness of the material to absorb the visible light is 0.25 mm.

Referring to the first graph 810 and the second graph 820, it may be recognized that the material to absorb visible light having the thickness of 1 mm has a visible light absorbing effect more excellent than that of the material to absorb the visible light having the thickness of 0.25 mm. According to various embodiments, as the thickness of the material to absorb the visible light is increased, the visible light absorbing effect becomes more excellent.

Figure 9:
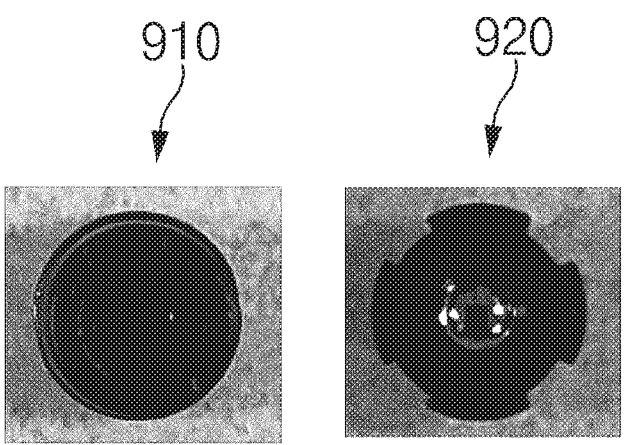
FIG. 9 illustrates an outer appearance of a camera module, according to various embodiments.

FIG. 9 illustrates an outer appearance of a camera module, according to various embodiments.

Referring to FIG. 9, outer appearance of a first camera module 910 and a second camera module 920 are illustrated. According to an embodiment, the first camera module 910 may be a camera module (e.g., the camera module 120 of FIG. 2) using a material to absorb a visible light and having an anti-reflective coating according to the disclosure. The second camera module 920 may be a camera module that blocks at least a portion of a visible light band by using a reflective coating.

In the second camera module 920 having the reflective coating formed thereon, reflected light may be strongly recognized from the outside, thereby degrading aesthetics. Meanwhile, the first camera module 910 having the anti-reflective coating may have a better aesthetic because the reflected light recognized from the outside is at a specified level or less.

Figure 10:
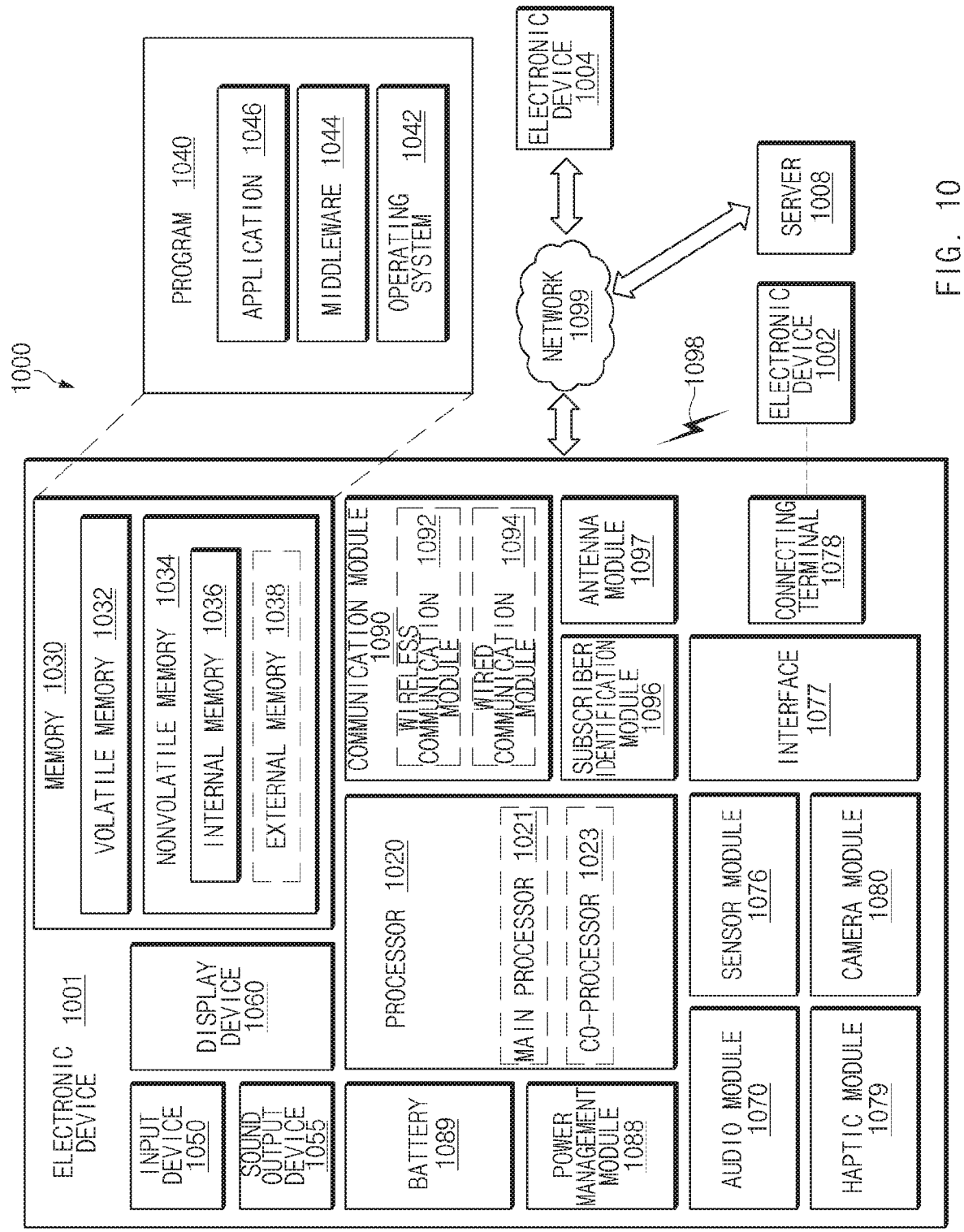
FIG. 10 is a block diagram illustrating an electronic device in a network environment according to various embodiments.

FIG. 10 is a block diagram illustrating an electronic device in a network environment according to various embodiments.

Referring to FIG. 10, the electronic device 1001 in the network environment 1000 may communicate with an electronic device 1002 via a first network 1098 (e.g., a short-range wireless communication network), or an electronic device 1004 or a server 1008 via a second network 1099 (e.g., a long-range wireless communication network). According to an embodiment, the electronic device 1001 may communicate with the electronic device 1004 via the server 1008. According to an embodiment, the electronic device 1001 may include a processor 1020, memory 1030, an input device 1050, a sound output device 1055, a display device 1060, an audio module 1070, a sensor module 1076, an interface 1077, a haptic module 1079, a camera module 1080, a power management module 1088, a battery 1089, a communication module 1090, a subscriber identification module (SIM) 1096, or an antenna module 1097. In some embodiments, at least one (e.g., the display device 1060 or the camera module 1080) of the components may be omitted from the electronic device 1001, or one or more other components may be added in the electronic device 1001. In some embodiments, some of the components may be implemented as single integrated circuitry. For example, the sensor module 1076 (e.g., a fingerprint sensor, an iris sensor, or an illuminance sensor) may be implemented as embedded in the display device 1060 (e.g., a display).

The processor 1020 may execute, for example, software (e.g., a program 1040) to control at least one other component (e.g., a hardware or software component) of the electronic device 1001 coupled with the processor 1020, and may perform various data processing or computation. According to one embodiment, as at least part of the data processing or computation, the processor 1020 may load a command or data received from another component (e.g., the sensor module 1076 or the communication module 1090) in volatile memory 1032, process the command or the data stored in the volatile memory 1032, and store resulting data in non-volatile memory 1034. According to an embodiment, the processor 1020 may include a main processor 1021 (e.g., a central processing unit (CPU) or an application processor (AP)), and an auxiliary processor 1023 (e.g., a graphics processing unit (GPU), an image signal processor (ISP), a sensor hub processor, or a communication processor (CP)) that is operable independently from, or in conjunction with, the main processor 1021. Additionally or alternatively, the auxiliary processor 1023 may be adapted to consume less power than the main processor 1021, or to be specific to a specified function. The auxiliary processor 1023 may be implemented as separate from, or as part of the main processor 1021.

The auxiliary processor 1023 may control at least some of functions or states related to at least one component (e.g., the display device 1060, the sensor module 1076, or the communication module 1090) among the components of the electronic device 1001, instead of the main processor 1021 while the main processor 1021 is in an inactive (e.g., sleep) state, or together with the main processor 1021 while the main processor 1021 is in an active state (e.g., executing an application). According to an embodiment, the auxiliary processor 1023 (e.g., an image signal processor or a communication processor) may be implemented as part of another component (e.g., the camera module 1080 or the communication module 1090) functionally related to the auxiliary processor 1023.

The memory 1030 may store various data used by at least one component (e.g., the processor 1020 or the sensor module 1076) of the electronic device 1001. The various data may include, for example, software (e.g., the program 1040) and input data or output data for a command related thereto. The memory 1030 may include the volatile memory 1032 or the non-volatile memory 1034.

The program 1040 may be stored in the memory 1030 as software, and may include, for example, an operating system (OS) 1042, middleware 1044, or an application 1046.

The input device 1050 may receive a command or data to be used by other component (e.g., the processor 1020) of the electronic device 1001, from the outside (e.g., a user) of the electronic device 1001. The input device 1050 may include, for example, a microphone, a mouse, a keyboard, or a digital pen (e.g., a stylus pen).

The sound output device 1055 may output sound signals to the outside of the electronic device 1001. The sound output device 1055 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 1060 may visually provide information to the outside (e.g., a user) of the electronic device 1001. The display device 1060 may include, for example, a display, a hologram device, or a projector and control circuitry to control a corresponding one of the display, hologram device, and projector. According to an embodiment, the display device 1060 may include touch circuitry adapted to detect a touch, or sensor circuitry (e.g., a pressure sensor) adapted to measure the intensity of force incurred by the touch.

The audio module 1070 may convert a sound into an electrical signal and vice versa. According to an embodiment, the audio module 1070 may obtain the sound via the input device 1050, or output the sound via the sound output device 1055 or a headphone of an external electronic device (e.g., an electronic device 1002) directly (e.g., wiredly) or wirelessly coupled with the electronic device 1001.

The sensor module 1076 may detect an operational state (e.g., power or temperature) of the electronic device 1001 or an environmental state (e.g., a state of a user) external to the electronic device 1001, and then generate an electrical signal or data value corresponding to the detected state. According to an embodiment, the sensor module 1076 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1077 may support one or more specified protocols to be used for the electronic device 1001 to be coupled with the external electronic device (e.g., the electronic device 1002) directly (e.g., wiredly) or wirelessly. According to an embodiment, the interface 1077 may include, for example, a high definition multimedia interface (HDMI), a universal serial bus (USB) interface, a secure digital (SD) card interface, or an audio interface.

A connecting terminal 1078 may include a connector via which the electronic device 1001 may be physically connected with the external electronic device (e.g., the electronic device 1002). According to an embodiment, the connecting terminal 1078 may include, for example, a HDMI connector, a USB connector, a SD card connector, or an audio connector (e.g., a headphone connector).

The haptic module 1079 may convert an electrical signal into a mechanical stimulus (e.g., a vibration or a movement) or electrical stimulus which may be recognized by a user via his tactile sensation or kinesthetic sensation. According to an embodiment, the haptic module 1079 may include, for example, a motor, a piezoelectric element, or an electric stimulator.

The camera module 1080 may capture a still image or moving images. According to an embodiment, the camera module 1080 may include one or more lenses, image sensors, image signal processors, or flashes.

The power management module 1088 may manage power supplied to the electronic device 1001. According to one embodiment, the power management module 1088 may be implemented as at least part of, for example, a power management integrated circuit (PMIC).

The battery 1089 may supply power to at least one component of the electronic device 1001. According to an embodiment, the battery 1089 may include, for example, a primary cell which is not rechargeable, a secondary cell which is rechargeable, or a fuel cell.

The communication module 1090 may support establishing a direct (e.g., wired) communication channel or a wireless communication channel between the electronic device 1001 and the external electronic device (e.g., the electronic device 1002, the electronic device 1004, or the server 1008) and performing communication via the established communication channel. The communication module 1090 may include one or more communication processors that are operable independently from the processor 1020 (e.g., the application processor (AP)) and supports a direct (e.g., wired) communication or a wireless communication. According to an embodiment, the communication module 1090 may include a wireless communication module 1092 (e.g., a cellular communication module, a short-range wireless communication module, or a global navigation satellite system (GNSS) communication module) or a wired communication module 1094 (e.g., a local area network (LAN) communication module or a power line communication (PLC) module). A corresponding one of these communication modules may communicate with the external electronic device via the first network 1098 (e.g., a short-range communication network, such as Bluetooth™, wireless-fidelity (Wi-Fi) direct, or infrared data association (IrDA)) or the second network 1099 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1092 may identify and authenticate the electronic device 1001 in a communication network, such as the first network 1098 or the second network 1099, using subscriber information (e.g., international mobile subscriber identity (IMSI)) stored in the subscriber identification module 1096.

The antenna module 1097 may transmit or receive a signal or power to or from the outside (e.g., the external electronic device) of the electronic device 1001. According to an embodiment, the antenna module 1097 may include an antenna including a radiating element composed of a conductive material or a conductive pattern formed in or on a substrate (e.g., PCB). According to an embodiment, the antenna module 1097 may include a plurality of antennas. In such a case, at least one antenna appropriate for a communication scheme used in the communication network, such as the first network 1098 or the second network 1099, may be selected, for example, by the communication module 1090 (e.g., the wireless communication module 1092) from the plurality of antennas. The signal or the power may then be transmitted or received between the communication module 1090 and the external electronic device via the selected at least one antenna. According to an embodiment, another component (e.g., a radio frequency integrated circuit (RFIC)) other than the radiating element may be additionally formed as part of the antenna module 1097.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1001 and the external electronic device 1004 via the server 1008 coupled with the second network 1099. Each of the electronic devices 1002 and 1004 may be a device of a same type as, or a different type, from the electronic device 1001. According to an embodiment, all or some of operations to be executed at the electronic device 1001 may be executed at one or more of the external electronic devices 1002, 1004, or 1008. For example, if the electronic device 1001 should perform a function or a service automatically, or in response to a request from a user or another device, the electronic device 1001, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1001. The electronic device 1001 may provide the outcome, with or without further processing of the outcome, as at least part of a reply to the request. To that end, a cloud computing, distributed computing, or client-server computing technology may be used, for example.

Figure 11:
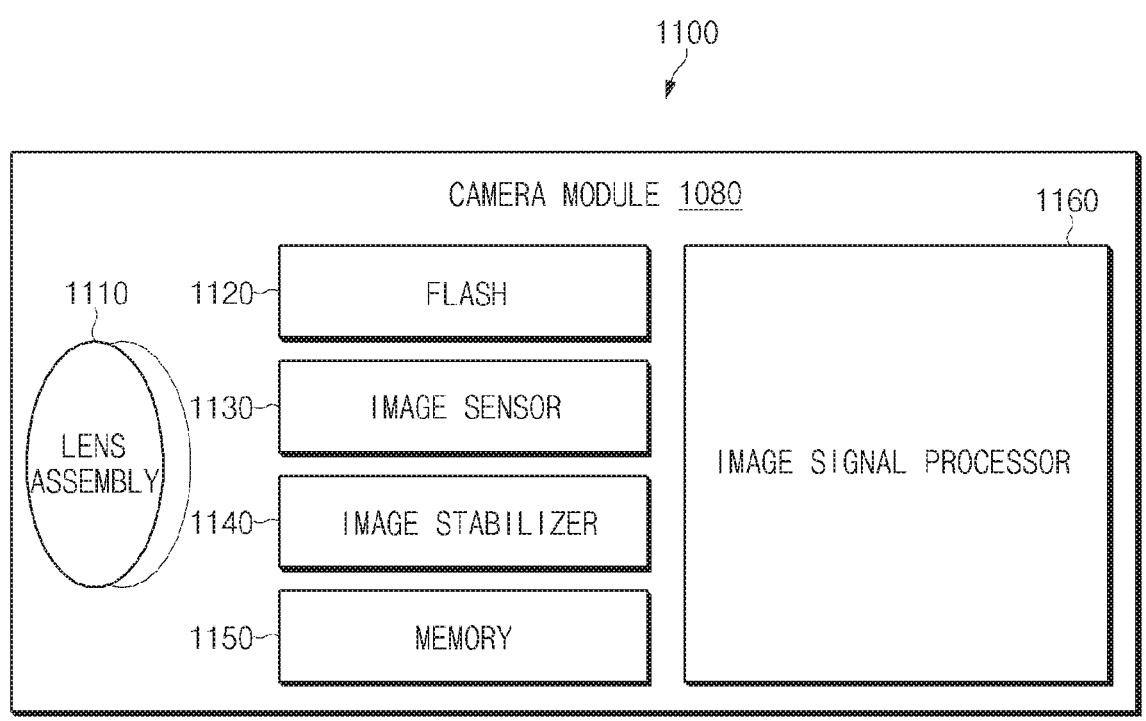
FIG. 11 is a block diagram illustrating the camera module according to various embodiments.

FIG. 11 is a block diagram 1100 illustrating the camera module according to various embodiments. Referring to FIG. 11, the camera module 1080 may include a lens assembly 1110, a flash 1120, an image sensor 1130, an image stabilizer 1140, memory 1150 (e.g., buffer memory), or an image signal processor 1160. The lens assembly 1110 may collect light emitted or reflected from an object whose image is to be taken. The lens assembly 1110 may include one or more lenses. According to an embodiment, the camera module 1080 may include a plurality of lens assemblies 1110. In such a case, the camera module 1080 may form, for example, a dual camera, a 360-degree camera, or a spherical camera. Some of the plurality of lens assemblies 1110 may have the same lens attribute (e.g., view angle, focal length, auto-focusing, f number, or optical zoom), or at least one lens assembly may have one or more lens attributes different from those of another lens assembly. The lens assembly 1110 may include, for example, a wide-angle lens or a telephoto lens.

The flash 1120 may emit light that is used to reinforce light reflected from an object. According to an embodiment, the flash 1120 may include one or more light emitting diodes (LEDs) (e.g., a red-green-blue (RGB) LED, a white LED, an infrared (IR) LED, or an ultraviolet (UV) LED) or a xenon lamp. The image sensor 1130 may obtain an image corresponding to an object by converting light emitted or reflected from the object and transmitted via the lens assembly 1110 into an electrical signal. According to an embodiment, the image sensor 1130 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 1130 may be implemented using, for example, a charged coupled device (CCD) sensor or a complementary metal oxide semiconductor (CMOS) sensor.

The image stabilizer 1140 may move the image sensor 1130 or at least one lens included in the lens assembly 1110 in a particular direction, or control an operational attribute (e.g., adjust the read-out timing) of the image sensor 1130 in response to the movement of the camera module 1080 or the electronic device 1001 including the camera module 1080. This allows compensating for at least part of a negative effect (e.g., image blurring) by the movement on an image being captured. According to an embodiment, the image stabilizer 1140 may sense such a movement by the camera module 1080 or the electronic device 1001 using a gyro sensor (not shown) or an acceleration sensor (not shown) disposed inside or outside the camera module 1080. According to an embodiment, the image stabilizer 1140 may be implemented, for example, as an optical image stabilizer.

The memory 1150 may store, at least temporarily, at least part of an image obtained via the image sensor 1130 for a subsequent image processing task. For example, if image capturing is delayed due to shutter lag or multiple images are quickly captured, a raw image obtained (e.g., a Bayer-patterned image, a high-resolution image) may be stored in the memory 1150, and its corresponding copy image (e.g., a low-resolution image) may be previewed via the display device 1060. Thereafter, if a specified condition is met (e.g., by a user's input or system command), at least part of the raw image stored in the memory 1150 may be obtained and processed, for example, by the image signal processor 1160. According to an embodiment, the memory 1150 may be configured as at least part of the memory 1030 or as a separate memory that is operated independently from the memory 1030.

The image signal processor 1160 may perform one or more image processing with respect to an image obtained via the image sensor 1130 or an image stored in the memory 1150. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 1160 may perform control (e.g., exposure time control or read-out timing control) with respect to at least one (e.g., the image sensor 1130) of the components included in the camera module 1080. An image processed by the image signal processor 1160 may be stored back in the memory 1150 for further processing, or may be provided to an external component (e.g., the memory 1030, the display device 1060, the electronic device 1002, the electronic device 1004, or the server 1008) outside the camera module 1080. According to an embodiment, the image signal processor 1160 may be configured as at least part of the processor 1020, or as a separate processor that is operated independently from the processor 1020. If the image signal processor 1160 is configured as a separate processor from the processor 1020, at least one image processed by the image signal processor 1160 may be displayed, by the processor 1020, via the display device 1060 as it is or after being further processed.

According to an embodiment, the electronic device 1001 may include a plurality of camera modules 1080 having different attributes or functions. In such a case, at least one of the plurality of camera modules 1080 may form, for example, a wide-angle camera and at least another of the plurality of camera modules 1080 may form a telephoto camera. Similarly, at least one of the plurality of camera modules 1080 may form, for example, a front camera and at least another of the plurality of camera modules 1080 may form a rear camera.

According to an embodiment disclosed herein, an electronic device (e.g., the electronic device 100) may include a light source unit (e.g., the light source unit 110) to emit infrared light having a specified wavelength band, a camera module (e.g., the camera module 120), a memory (e.g., the memory 130), and a processor (e.g., the processor 140), the camera module may include a lens assembly (e.g., the lens assembly 121) including a first lens (e.g., the first lens 121-1) having a property to at least partially absorb visible light and one or more second lenses (e.g., the second lenses 121-2a and 121-2b) to refract light output through the first lens at a specified angle, a filter (e.g., the filter 122) to pass through light, which has the specified wavelength band, of the light output through the lens assembly, and an image sensor (e.g., the image sensor 123) to sense light, which is output through the lens assembly and the filter, to obtain an image, and the processor may be configured to receive an input of a user to photograph an external object, emit the infrared light using the light source unit based on the input of the user, and obtain, using the camera module, an image corresponding to light, which is reflected from the external object, of the emitted infrared light.

According to an embodiment, a surface of the first lens facing an outside may be anti-reflective coated.

According to an embodiment, a distance between a surface, which faces an outside, of the first lens and the image sensor may be 1.0 mm or more and 6.5 mm or less.

According to an embodiment, a thickness of a center of the first lens may be 0.15 mm or more and 5 mm or less. According to an embodiment, the thickness of the center of the first lens may be 0.15 mm or more and 4 mm or less. According to an embodiment, the thickness of the center of the first lens may be 0.15 mm or more and 3 mm or less. According to an embodiment, the thickness of the center of the first lens is 0.15 mm or more and 2.5 mm or less.

According to an embodiment, the specified wavelength band may include a band of 700 nm to 850 nm.

According to an embodiment, a difference between a first wavelength having a transmittance of 90% relative to a maximum transmittance and a second wavelength having a transmittance of 10% relative to the maximum transmittance may be 100 nm.

According to an embodiment, a pass band of the camera module may include a band of 800 nm or more and 950 nm or less, and may be defined as having a transmittance of 50% relative to the maximum transmittance.

According to an embodiment, the processor authenticates a user as being a legitimate user, when a likelihood between the obtained image and an image, which is previously stored in the memory, of the legitimate user is at a specified level or more.

In addition, according to an embodiment disclosed herein, a camera module may include a lens assembly, a filter to pass through light, which has a specified wavelength band, of light output through the lens assembly, and an image sensor to obtain an IR image in response to light output through the lens assembly and the filter. The lens assembly may include a first lens having a property to at least partially absorb visible light of light incident from an outside, and at least one lens to pass through light output through the first lens.

According to an embodiment, a surface, which faces an outside, of the first lens may be anti-reflective coated.

According to an embodiment, a distance between a surface, which faces an outside, of the first lens and the image sensor may be 1.0 mm or more and 6.5 mm or less.

According to an embodiment, a thickness of a center of the first lens may be 0.2 mm or more and 5 mm or less.

According to an embodiment, the specified wavelength band may include a band of 700 nm to 850 nm.

According to an embodiment, a difference between a first wavelength having a transmittance of 90% relative to a maximum transmittance and a second wavelength having a transmittance of 10% relative to the maximum transmittance may be 100 nm.

According to an embodiment, a pass band of the camera module may include a band of 800 nm or more and 950 nm or less, and may be defined as having a transmittance of 50% relative to the maximum transmittance In addition, according to another embodiment disclosed herein, an electronic device may include a housing including a cover glass including a first area and a second area to pass light, a back cover opposite to the cover glass, and a side member surrounding the space between the cover glass and the back cover, the light source unit to emit infrared light having a specified wavelength band toward the outside through the first area, a camera module, a memory, and a processor. The camera module may include a lens assembly including a first lens having a property to at least partially absorb visible light band of light incident from the outside through the second area, and a second lens through which the light output from the first lens passes, a filter to pass through light, which includes the specified wavelength band, of the light output through the lens assembly, and an image sensor to obtain an image in response to the light output through the lens assembly and the filter.

According to an embodiment, the processor may be configured to receive an input of a user to photograph an external object, control the light source unit to emit infrared light having a specified wavelength band toward the outside based on the user input, and control the camera module to obtain an image corresponding to infrared light having the specified wavelength band with respect to the external object.

According to an embodiment, the processor may authenticate a user as being a legitimate user, when a likelihood between the obtained image and an image of the legitimate user, which is previously stored in the memory, is at a specified level or more.

According to an embodiment disclosed herein, the camera module may effectively pass through the light in a specified wavelength band. Accordingly, the camera module may obtain a clearer image regardless of the incident angle. In addition, the electronic device including the camera module may increase aesthetics and provide excellent usability to the user.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1040) including one or more instructions that are stored in a storage medium (e.g., internal memory 1036 or external memory 1038) that is readable by a machine (e.g., the electronic device 1001). For example, a processor (e.g., the processor 1020) of the machine (e.g., the electronic device 1001) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
a light source unit to emit infrared light having a specified wavelength band;
a camera module, wherein the camera module includes:
a lens assembly including a first lens having a property to at least partially absorb visible light and a second lens to refract light, which is output through the first lens, at a specified angle;
a filter to pass through light, which has the specified wavelength band, of the light output through the lens assembly; and
an image sensor to sense the light, which is output through the lens assembly and the filter, to obtain an image,
a memory; and
a processor,
wherein the first lens include a material that absorbs at least a portion of visible light, and the light output to the second lens through the first lens is configured to include visible light which is at a specified level or less, and
wherein the processor is configured to:
receive an input of a user to photograph an external object;
emit the infrared light using the light source unit based on the input of the user; and
obtain, using the camera module, an image corresponding to light, which is reflected from the external object, of the emitted infrared light.

2. The electronic device of claim 1, wherein a surface of the first lens facing an outside is anti-reflective coated.

3. The electronic device of claim 1, wherein a distance between a surface, which faces an outside, of the first lens and the image sensor is 1.0 mm or more and 6.5 mm or less.

4. The electronic device of claim 1, wherein a thickness of a center of the first lens is 0.15 mm or more and 5 mm or less.

5. The electronic device of claim 4, wherein the thickness of the center of the first lens is 0.15 mm or more and 4 mm or less.

6. The electronic device of claim 4, wherein the thickness of the center of the first lens is 0.15 mm or more and 3 mm or less.

7. The electronic device of claim 4, wherein the thickness of the center of the first lens is 0.15 mm or more and 2.5 mm or less.

8. The electronic device of claim 1, wherein the specified wavelength band includes a band of 700 nm to 850 nm.

9. The electronic device of claim 1, wherein a difference between a first wavelength having a transmittance of 90% relative to a maximum transmittance and a second wavelength having a transmittance of 10% relative to the maximum transmittance is 100 nm or less in the lens assembly.

10. The electronic device of claim 1, wherein a pass band of the camera module includes a band of 800 nm or more and 950 nm or less, and is defined as having a transmittance of 50% relative to a maximum transmittance.

11. The electronic device of claim 1, wherein the processor authenticates the user as being a legitimate user, when a likelihood between the obtained image and an image, which is previously stored in the memory, of the legitimate user is at a specified level or more.

12. A camera module comprising:
a lens assembly, wherein the lens assembly includes:
a first lens having a property to at least partially absorb visible light of light incident from an outside; and
at least one lens to pass through light output through the first lens, a filter to pass through light, which has a specified wavelength band, of light output through the lens assembly; and an image sensor to obtain an IR image in response to light output through the lens assembly and the filter, wherein the first lens include a material that absorbs at least a portion of visible light, and the light output to the at least one lens through the first lens is configured to include visible light which is at a specified level or less.

13. The camera module of claim 12, wherein a surface, which faces an outside, of the first lens is anti-reflective coated.

14. The camera module of claim 12, wherein a distance between a surface, which faces an outside, of the first lens and the image sensor is 1.0 mm or more and 6.5 mm or less.

15. The camera module of claim 12, wherein a thickness of a center of the first lens is 0.2 mm or more and 5 mm or less.

\* \* \* \* \*